United States Patent Office 2,937,983
Patented May 24, 1960

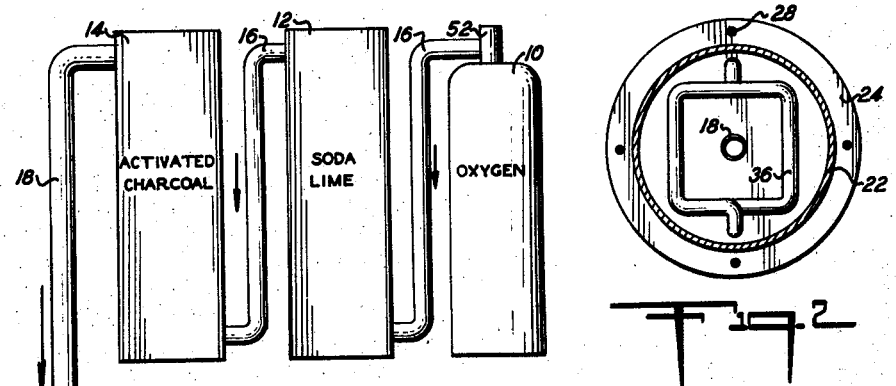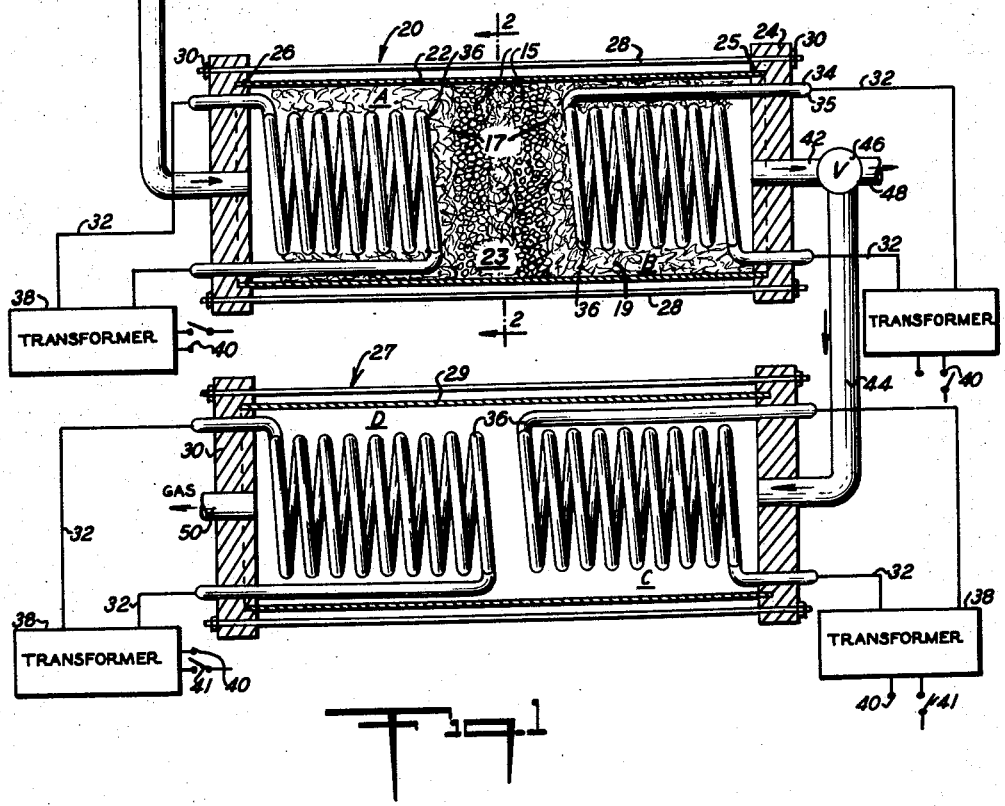

2,937,983

APPARATUS AND METHOD FOR PRODUCING A CONTROLLED OZONE CONTENT IN OXYGEN

Edmund J. Ryan, Miami, Fla., assignor to Poly-Gas Research and Development Co., Inc.

Filed Mar. 11, 1955, Ser. No. 493,656

5 Claims. (Cl. 204—193)

This invention relates to production of ozone and higher oxygen polymers to a controlled content in oxygen. More particularly, the invention provides a method and apparatus for producing substantially pure oxygen with a controlled content of ozone and higher oxygen polymers for therapeutic use, most usually preferred in the range of 5 to 100 p.p.m. or higher when desired such as up to 500 p.p.m. If necessary, for specific cases, where the gas is to be applied externally, higher concentrations may be used.

Ordinary ozone as normally produced, usually in air but sometimes in oxygen is quite unstable. The ozone content usually varies between about 1 and 2% by volume both as produced with variable quantities of moisture in the oxygen containing gas being ozonized, and as produced with other impurities usually associated with such gas having a catalytic effect to reduce the content of the unstable ozone component therein, and with conditions and period of storage.

A substantial source of contamination which catalyzes the breaking down of the unstable ozone molecule is metal oxides, most usually copper oxide, picked up from apparatus (electrical) with which the gas usually comes in contact in production, or metal oxides from containers for the initial oxygen supply or storage of the ozone containing gas.

More specifically, according to the present invention, I have found that it is possible to use ozone containing oxygen for many therapeutic applications provided that the gas, free of such impurities, is produced with a carefully controlled ozone and polymeric oxygen content so that a substantially exact concentration and quantity of ozone introduced into the human body is controlled at will.

It is accordingly a primary object of the present invention to convert oxygen gas to a substantially pure oxygen gas with a controlled ozone and polymeric oxygen content from about 5 to 100 parts per million or higher as needed, such as up to 500 p.p.m. directly useful as needed for therapeutic purposes. It is a second object of this invention to provide apparatus flexibly controlled to produce an oxygen gas with a desired ozone and polymeric oxygen content in this range.

Further objects are inherent in the description of the drawings wherein

Fig. 1 illustrates purifying columns associated with a series of ozone and polymeric oxygen reactors, self-contained as a single apparatus unit, in which the reactors are in longitudinal section to show internal construction; and Fig. 2 is a radial section through one of the reactors taken on the line 2—2 of Fig. 1.

A source of oxygen gas in a container 10 is provided which will contain oxygen of as good quality as commercially available, such as 98% oxygen together with such removable impurities as traces of moisture and carbon dioxide. The gas is passed through purifying columns 12 and 14 in a series by way of ducts 16; the column 12 containing fragments of soda lime, and the column 14 containing active charcoal (carbon) respectively, each together with fibrous packing as conventional in a gas purification column to remove gaseous as well as solid impurities and prevent any carry-over of solid dust particles. Such purification produces an oxygen gas of approximately 99% pure $O_2$. The purified oxygen gas passes through a duct 18 to a first reactor 20 comprising an ultra violet light chamber 23.

The reactor 20 comprises a cylindrical housing tube 22 of non-metallic substance such as hard, heat-stable and oxygen-resistant plastic, for example, hard Bakelite (phenol-formaldehyde condensation) plastic enclosing the chamber 23. The tube 22 is mounted to end seals, comprising plates 24 and 26 which may be composed of similar non-metallic substance but which may be either of similar plastic, such as Bakelite, and sealed thereto through circular grooves 25 in gas tight fit using a plastic adhesive such as a solvent soluble form of Bakelite set in the seal with heat, after applying in liquid form. The end pieces, 24 and 26, are further tightly secured to the tube 22 by bracing rods 28 which extend from the end piece 26 to the end piece 24 and are bolted at 30 for tight securement under pressure to the tube 22.

The tube 22 has mounted, cooperative with each respective end, two ultra violet light "burners" A and B each of which comprise a coil 36 of fused quartz tubing having electrical lead wires 32 fused in each end 34 of the tube 36. Each lead wire in the tube end is preferably surrounded by a globule of mercury 35 for improved electrically conductive contact with the interior of the quartz tube 36. Each quartz tube 36 is filled and sealed at its ends 34 with a blend of inert gases argon and krypton adjusted in proportion and pressure whereby the argon is under a pressure of about 8 millimeters and the krypton is under a pressure of about 1.5 millimeters Hg. In that adjusted proportion the gas spectrum when electrically energized to a light emissive state will give approximately the wave length of the mercury itself. Moreover, in the electrically excited state the gases will emit ultra violet in the specific wave length of approximately 2485 to 2537 angstrom units which is optimum both to destroy bacteria as well as to produce a specific quantity of ozone and polymeric oxygen in the oxygen exposed thereto under conditions herein specified.

To provide a controlled surface area of quartz tube emission of ultra violet light in said wave length range, whereby to produce approximately 3 to 25 per million of ozone and polymeric oxygen in the oxygen gas per burner by the ultra violet light exposure at atmospheric pressure of oxygen gas passing over the light emitting surface of the quartz tube, the quartz tube used is ¼ inch tubing and is coiled in a square configuration about 3" on a diagonal, as shown in Fig. 2, from approximately a six foot length (prior to coiling) of the quartz tubing. Thus the quartz tube coils 36 in each section A, B, C and D, etc. have duplicate ultra violet light emitting capacity and consequently have duplicate ozone and polymeric oxygen generating capacity.

Each lead wire 32 communicating with the ends 34 of the burner coils 36 as described, lead to respective transformers 38 supplying a secondary voltage in the range of 3000 to 10,000 volts usually operating at 5,000 volts, from a primary input of 110 volts A.C. supplied to the leads 40. Each lead 40 has a switch 41 whereby any one or more of the several ultra violet light burners A, B, C or D may be electrically energized as desired.

As shown in Fig. 1 there are two reactors 20 and 27 comprising the Bakelite tubes 22 and 29 interconnected for passage of the partially ozonized gas from the first tube to the second tube 29 through the duct 44. Thus several reactors with tubes 22 and 29, each having a pair of burners mounted therein, may be operated in series for irradiation of oxygen gas by any desired number of standardized quartz ultra violet light emitters whereby the gas is treated serially with from 1 to 4 burner units A, B, C and D to increase the ozone and higher oxygen polymer concentration serially in specific increments as desired. A three-way valve 46 is mounted between the outlet 42 and inlet 44 so that gas may be taken off of duct 42 for use at that point if desired through outlet 48; or the ozone and polymeric oxygen containing oxygen gas may be ultimately taken off through an outlet 50 after additional ozone and polymeric oxygen generation in the second reactor unit 27 as desired. Obviously although the figure shows two such units 20 and 27, which are variably controlled to impart an ozone and higher oxygen polymer content of 5 to 100 p.p.m. to the oxygen, there may be any additional number similarly mounted serially to further increase the ozone and higher oxygen polymer concentration to a higher limit such as up to 500 p.p.m. for therapeutic use.

As shown in Fig. 1 the reactor 20 also may have mounted therein barrier layers of soda-lime 15 and active carbon 17 so that for ultimate simplification, where only one reactor is used, the preliminary charcoal and soda-lime towers 12 and 14 may be omitted. Alternatively, the soda-lime and carbon layers in the tube 22 may be omitted when their function is adequately performed by the towers 12 and 14, and as shown in the omission of these materials in reactor 29, such duplication is unnecessary. When these gas purifying substances are placed in the tube 22, they are further held by fibrous glass wool packing 19 to prevent entrainment of dust.

In operation as the apparatus is thus described, the first burner A in reactor 20, when activated, will produce about 3 to 25 parts per million of ozone and polymeric oxygen gas in pure oxygen supplied thereto through duct 18 variable with the oxygen pressure and flow rate. If the desired concentration is obtainable with the single burner, the second burner B therein will be left inactivated and the gas produced in this operation containing about 3 to 25 parts per million of ozone and polymeric oxygen, will be taken off at outlet 48 for immediate therapeutic use. When the gas is desired to have an increased ozone and polymeric oxygen content such as 10 to 50 parts per million, then the burner B is activated and the gas again taken off at outlet 48. For an additional increment such as a 15 to 75 parts per million ozone and polymeric oxygen content, the gas is passed through the second reactor unit 27 with the burner C activated; or for a fourth increment, with both C and D burners activated, the gas containing 20 to 100 parts per million ozone and polymeric oxygen is taken off at 50, or maybe further treated serially with additional reactors not shown to produce the desired ozone and polymeric oxygen content in the gas.

Increasing the pressure of the oxygen passed through the unit results in a substantially increased ozone and polymeric oxygen content, and as designed, each reactor unit will tolerate up to 500 lbs. pressure. That treatment at increased pressure gives an additional variable control in ozone and polymeric oxygen content by use of higher pressures, controlled by a variable pressure reducing valve 52 of standard construction mounted at the outlet of the oxygen container 10 to supply whatever oxygen pressure is desired. Some further variation of ozone and higher oxygen polymer content is available by temperature variation by heating or cooling the gas passing through line 18 by any conventional means not shown, but such is generally unnecessary inasmuch as some temperature variation will result from variation of the flow rate upon rapid or slow release of oxygen from confinement in the pressure resistant container 10 in which the oxygen is stored.

An additional control of the quantity of ozone and polymeric oxygen produced in the gas is in the flow rate of gas passed through the apparatus. Normally in the dimensions given, from 1 to 5 liters of gas per minute may be passed through the device at a pressure from atmospheric to 500 lbs. per square inch. A typical operation may consist of about two liters of gas per minute passed through the apparatus at a pressure of about 50 lbs. per square inch to provide from a single burner unit an ozone containing oxygen gas of about 3 to 15 parts per million.

The following table illustrates the composition of the gas with variation in the number of burners operating, the flow rate and pressure of $O_2$ being treated.

| Conditions | One Burner, p.p.m. | Two Burners, p.p.m. | Three Burners, p.p.m. | Four Burners, p.p.m. |
| --- | --- | --- | --- | --- |
| Atmospheric pressure, 2 liter per minute flow | 2.5 | 5.0 | 7.5 | 10 |
| 50 p.s.i., 1 liter per minute | 15 | 30 | 45 | 60 |
| 100 p.s.i., 1 liter per minute | 25 | 50 | 75 | 100 |
| Atmospheric, 1 liter per minute | 4 | 8 | 12 | 16 |
| 50 p.s.i., 2 liter per minute | 10 | 20 | 30 | 40 |
| 100 p.s.i., 2 liter per minute | 20 | 40 | 60 | 80 |

A substantial advantage of operating in the critical wave length given is that the oxygen gas purified of carbon dioxide and moisture in the soda-lime and activated charcoal columns becomes sterilized to destroy the microorganic materials with which the gas may be contaminated for optimum therapeutic use.

The entire apparatus described is small, the container 10 can carry an adequate supply of oxygen for local therapeutic uses so that all of the elements of this apparatus are readily packaged for portability to the site of use.

The device being portable and readily controlled by a physician as to any desired specific ozone and polymeric oxygen concentration, allows immediate application to the patient according to his spot judgement as to the specific dosage to be applied.

Certain modifications will occur to those skilled in the arc and it is intended that the description herein given be regarded as exemplary and not limiting except as defined in the claims appended hereto.

I claim:

1. Apparatus for generating a controlled content of ozone and higher oxygen polymers in oxygen comprising at least one non-metallic housing enclosing a chamber, a plurality of coiled quartz tubes arranged serially in each chamber, each tube having ultra violet light emissive gases sealed therein proportioned to emit ultra violet light in a wave length range of 2485 to 2537 angstrom units when electrically energized, means for independently electrically energizing each tube to generate ultra violet light in controlled quantity from several tubes in combination to impart to each chamber a controlled emission of ultra violet light and means comprising a duct leading to one end of said housing communicating with said chamber and a duct leading from an opposite end of said housing communicating with said chamber for passing purified oxygen gas through said chamber in serial exposure to the ultra violet light generated from said tubes for serial generation of a controlled content in the range of 5 to 500 parts per million of ozone and polymeric oxygen in the purified oxygen.

2. Apparatus as defined in claim 1 wherein the first chamber further contains a granular packing comprising layers of activated carbon and soda-lime adapted to remove moisture and other impurities suspended in the oxygen gas passed therethrough.

3. Apparatus for generating a controlled content of ozone in oxygen for ozone therapy comprising a container having oxygen gas confined therein under pressure having means for controlling the pressure of oxygen gas emitted therefrom, several gas purifying columns having means therein for removing impurities from oxygen, duct means for passing oxygen gas from said container to said purifying columns and from said columns to a non-metallic housing enclosing a chamber comprising an ozone generator, said ozone generator comprising two coiled quartz tubes mounted one in each end of said chamber, each tube having a mixture of ultra violet light emissive gases sealed therein, said gases being proportioned to emit ultra violet light in a wave length of 2485 to 2537 angstrom units when electrically energized, each tube having the same constant value for emitting ultra violet light from the coiled surface thereof, whereby substantially pure oxygen may be passed into one end of said chamber and out of the other end to pass over the surfaces of both of said quartz tubes in series, and means for independently electrically energizing each of said coiled quartz tubes to emit ultra violet light.

4. Apparatus for generating a controlled content of ozone in oxygen for ozone therapy comprising several non-metallic housings each enclosing an ozonizing chamber, duct means interconnecting said chambers for serial flow of gas from one chamber to another and to lead treated gas away from the apparatus, valve means in said ducts for withdrawing ozonized gas after passing through any of the chambers for removal of gas at any intermediate or a final point after passage through all of said chambers in the series of ozonization, two coiled quartz tubes mounted one in each end of each chamber, each tube having a mixture of ultra violet light emissive gases electro-conductively sealed therein, said gases being proportioned to emit ultra violet light in a wave length of 2485 to 2537 angstrom units when electrically energized, each tube having the same constant value for emitting ultra violet light from the coiled surface thereof, means comprising a duct for passing substantially pure oxygen into one end of said chamber and a duct leading out of the other end of the enclosed chamber to pass over the surface of both of said quartz tubes in series and means for independently electrically energizing each of said coiled quartz tubes to emit ultra violet light.

5. Apparatus as defined in claim 1 wherein the said nonmetallic housing has two coiled tubes mounted one in each end of said chamber, each tube having the same constant capacity for emitting ultra violet light from its coiled surface.

References Cited in the file of this patent

UNITED STATES PATENTS

| | | |
|---|---|---|
| 359,424 | Brin et al. | Mar. 15, 1887 |
| 2,268,955 | Meier | Jan. 6, 1942 |
| 2,288,738 | Parfentjeu | July 7, 1942 |
| 2,637,688 | Ryan | May 5, 1953 |
| 2,705,219 | Heiskell et al. | Mar. 29, 1955 |

FOREIGN PATENTS

| | | |
|---|---|---|
| 169,514 | Germany | Apr. 9, 1906 |

OTHER REFERENCES

Vosmaer: Ozone, 1916, pp. 3, 110, and 171–173.